United States Patent [19]

Mason

[11] 4,316,109
[45] Feb. 16, 1982

[54] STATOR FOR MULTIROTOR D.C. MAGNETIC MOTORS

[76] Inventor: Elmer B. Mason, 901 Vickie Dr., Del City, Okla. 73115

[21] Appl. No.: 170,438

[22] Filed: Jul. 21, 1980

Related U.S. Application Data

[63] Continuation-in-part of Ser. No. 2,262, Jan. 10, 1979.

[51] Int. Cl.$^3$ ............................................. H02K 23/00
[52] U.S. Cl. .................................... 310/114; 310/126; 310/154
[58] Field of Search ............... 310/114, 126, 112, 154, 310/46

[56] References Cited

U.S. PATENT DOCUMENTS

| 374,959 | 12/1887 | Gray. | |
|---|---|---|---|
| 3,723,796 | 3/1973 | Mason | 310/126 |
| 3,757,149 | 9/1973 | Holper | 310/114 |
| 3,828,213 | 8/1974 | Yamashita et al. | 310/154 X |

FOREIGN PATENT DOCUMENTS 487529  4/1970  Switzerland.

Primary Examiner—Donovan F. Duggan
Attorney, Agent, or Firm—Robert K. Rhea

[57] ABSTRACT

In a high starting torque concentric rotor D.C. magnetic motor the back e.m.f. is greatly reduced by reducing the area of magnetic flux acting on the rotors to an arc of the respective rotor circumference spanning the number of the rotor segments spanned by the respective rotor brush contacting the commutator segments. A pair of parallel magnetic pole plates of opposite polarity are energized by a coil extending therebetween. Both rotors are supported adjacent one pole plate with their axis normal to the pole plate and in axial alignment with the coil. A plurality of equally spaced pole pieces, connected with a respective pole plate, extend in interdigitated relation parallel with the axis of the rotors in the spacing therebetween and in close spaced relation with respect to the inner peripheral portions of the outer rotor and circumferential portions of the inner rotor periphery.

2 Claims, 8 Drawing Figures

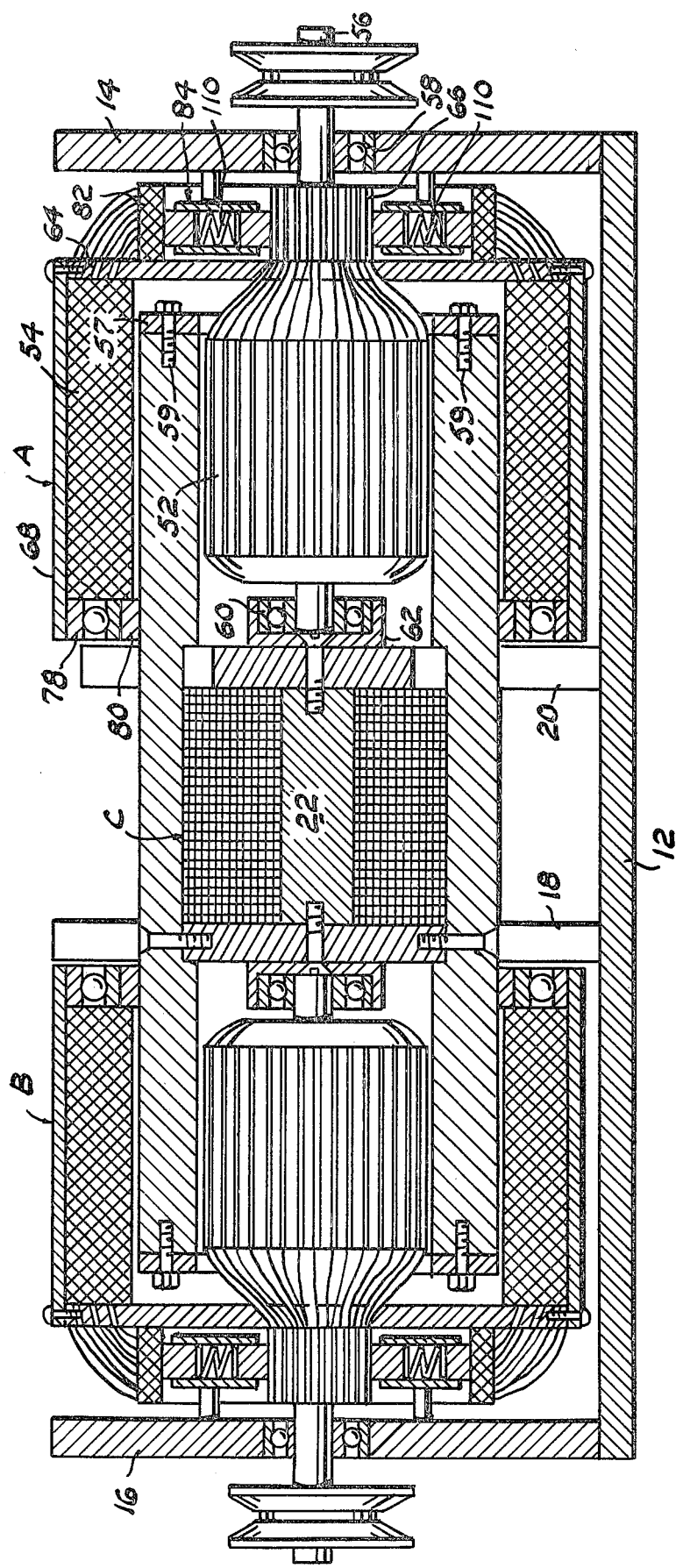
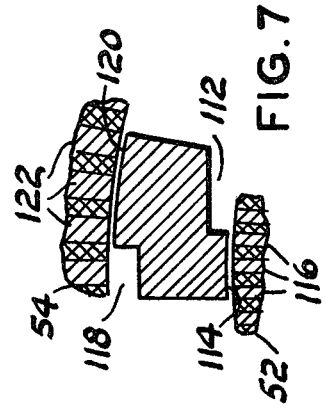
FIG. 2
FIG. 7

STATOR FOR MULTIROTOR D.C. MAGNETIC MOTORS

This is a continuation-in-part of application Ser. No. 2,262, filed Jan. 10, 1979.

BACKGROUND OF THE INVENTION

1. Field of the Invention.

The present invention relates to direct current motors and more particularly to a magnetic motor.

A direct current motor constructed in accordance with this invention finds particular application in industry where a high torque direct current motor, having an exceptionally high starting torque, is needed. For example, for starting the Diesel engine of a relatively large size truck-tractor commonly referred to as a "big cam Diesel". The engines of these truck-tractors are usually left running in cold weather when the truck-tractor rig is parked out-of-doors for the reason that when the motor and motor oil becomes cold the engine cannot be turned over or started with any presently available starter. This results in an unnecessary waste of Diesel fuel as well as wearing the engine. Further, a direct current motor of this type is needed for mounting on the "dead" axle of a truck-tractor to assist the internal combustion engine on long uphill grades.

2. Description of the Prior Art.

The most pertinent prior patents are believed to be U.S. Pat. Nos. 374,959; 3,757,149; Switzerland Pat. No. 487,529 4/70 and my Pat. No. 3,723,796. These patents generally disclose motors having the axes of the armatures arranged in parallel normal to the axis of a coil or coils as in U.S. Pat. No. 3,757,149 or parallel with the coil axis as in Switzerland Pat. No. 487,529; U.S. Pat. No. 374,959 and U.S. Pat. No. 3,723,796, featuring magnetic pole pieces surrounding diametrically opposite substantial portions of the respective armature periphery. This partial armature wrap-around feature of the magnetic pole pieces results in a back electromotive force (e.m.f.) opposing the magnetic attractive e.m.f. on the armature winding thus reducing the efficiency of the motor and reducing its torque. In the present invention the back e.m.f. is eliminated by reducing the area of magnetic flux acting on the rotor to an arc of the rotor circumference spanning the number of the rotor segments spanned by the respective rotor brush contacting the cooperating commutator segments. This results in forming a motor which has a substantially increased torque when compared with a conventional similar size or rated A.C. or D.C. motor having the major portion of its rotor periphery spanned by magnetic pole pieces or conventional field coils.

Other direct current high torque motors presently in use are generally characterized by the disadvantage of a relatively high amperage drag. This feature is particularly undesirable where, for example, the motor is utilized as the prime mover of a vehicle and has a constant amperage drag at a constant voltage whether climbing, cruising or coasting downhill. This invention provides a motor having an amperage drag in proportion to the load and in which the amperage drag is automatically reduced when a cruising speed is reached and is further reduced to a minimum under little or no load.

SUMMARY OF THE INVENTION

The axis of two pairs of concentric rotors are arranged in coaxial alignment normal to and on opposing sides of parallel opposite polarity pole plates having an energizing coil centrally disposed coaxially therebetween. A plurality of elongated pole pieces span and are selectively connected with the pole plates and disposed in circumferential equally spaced relation between the confronting outer and inner peripheries of the respective pairs of rotors parallel with their axis and in close spaced relation with respect to their outer and inner peripheries. That portion of each elongated pole piece adjacent the periphery of the respective rotor is limited to a width no greater than the transverse dimension of any three segments forming the respective rotor winding. The end portions of the pole pieces, projecting beyond the respective pole plate, are substantially coextensive with the respective rotor winding. The respective elongated pole pieces connected with the respective pole plate form magnetic poles of one polarity opposite the polarity of the pole pieces connected with the opposite pole plate to establish magnetic flux circuits for the respective armatures. The pole plate energizing coil is preferably wound at least two-in-hand about a coil core to provide a desired number of wraps about the core. These coil forming wires are connected in series or in parallel to a source of direct current and brushes contacting the respective rotor commutator. The pole pieces establish magnetic flux circuits for the rotors.

The principal object of this invention is to provide a direct current concentric rotor motor utilizing magnetic flux establishing a plurality of magnetic poles of opposite polarity disposed in spaced-apart parallel relation with respect to the longitudinal axis of the respective rotor for providing high torque and cool running characteristics.

BRIEF DESCRIPTION OF THE DRAWINGS

FIG. 2 is a vertical cross sectional view taken substantially along the line 2—2 of FIG. 1;

FIG. 7 is a fragmentary cross sectional view illustrating the transverse magnetic flux area between one of the pole pieces with respect to the respective rotor winding segments; and, FIG. 8 is a wiring schematic.

DESCRIPTION OF THE PREFERRED EMBODIMENT

Figure 1:
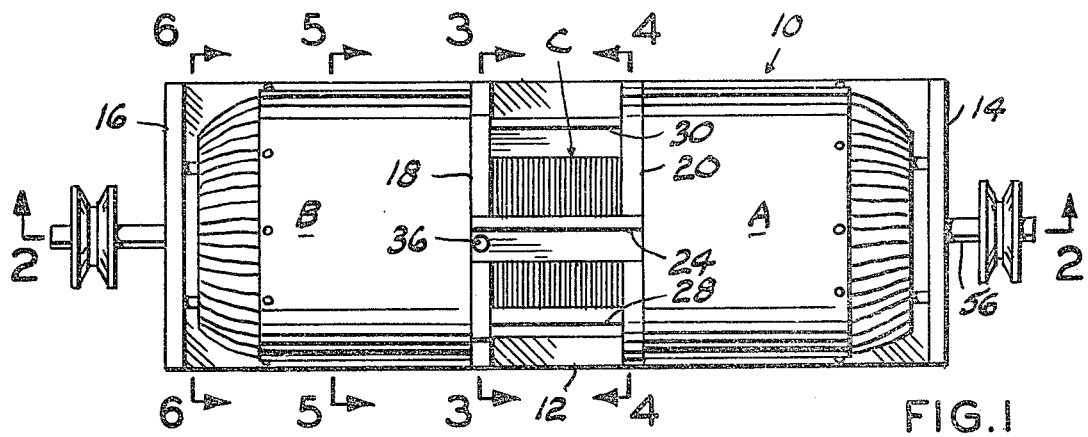
FIG. 1 is a top view of the motor.

Like characters of reference designate like parts in those figures of the drawings in which they occur.

In the drawings:

The reference numeral 10 indicates the motor which is generally cylindrical and includes a base 12 formed from nonmagnetic material having upstanding end walls 14 and 16 at its respective ends.

Intermediate its ends a pair of pole plates 18 and 20 are mounted on the base in upstanding parallel spaced-apart relation normal to the plane of the base.

A magnetic material coil core 22 extends centrally between the pole plates 18 and 20 and is connected thereto at its respective ends. A coil C is wound around the magnetic material core 22.

The coil C is formed by a plurality of wraps or runs of wire wound one-in-hand or by pairs about the periphery of the core 22. In the example shown, a pair of wires 23 and 25 (FIG. 8) are wound two-in-hand. The number of wraps or runs of the wires 23 and 25 is preferably an even number for providing maximum magnetic flux.

A plurality, four in the example shown, of elongated generally rectangular pole pieces 24, 26, 28 and 30, transversely span the pole plates 18 and 20 and project beyond the respective plate a selected distance in circumferentially equally spaced relation about the periphery of the coil C.

Figure 3:
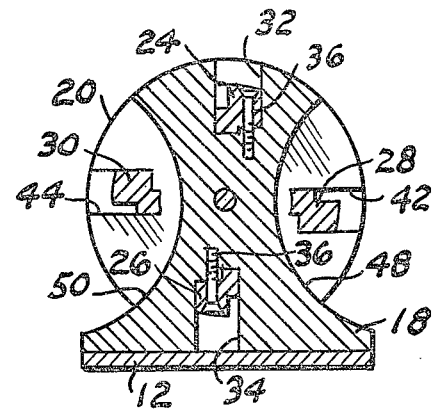

As shown by FIG. 3, diametrically opposite upper and lower recesses 32 and 34 are cut in the pole plate 18 for receiving intermediate portions of the pair of pole pieces 24 and 26 which are secured to the pole plate 18, as by bolts 36.

Figure 4:
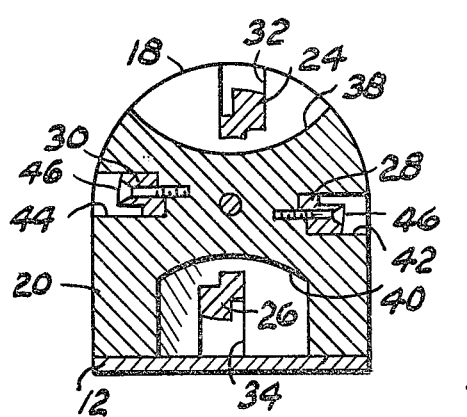
FIGS. 3, 4, 5 and 6 are vertical cross sectional views respectively taken substantially along the lines 3—3, 4—4, 5—5 and 6—6 of FIG. 1.

As shown by FIG. 4, diametrically opposite upper and lower portions of the pole plate 20 are cut away, as at 38 and 40, to permit the pole pieces 24 and 26 to extend beyond the pole plate 20 in magnetic spaced relation. Similarly, diametrically opposite recesses 42 and 44 are formed in the pole plate 20 for receiving an intermediate portion of the pair of pole pieces 28 and 30 which are similarly secured to the pole plate 20 by bolts 46. As shown by FIG. 3, diametrically opposite sides of the pole plate 18 are recessed or cut away, as at 48 and 50, to permit the pole pieces 28 and 30 to extend beyond the pole plate 18 in magnetic spaced relation.

The coil C, when energized, as presently explained, forms opposite poles for the pole plates 18 and 20, for example, the pole plate 18 forms a North pole and the pole plate 20 forms a South pole so that the pole pieces 24 and 26 form North poles and the pair of pole pieces 28 and 30 form South poles.

Since the motor 10 basically comprises two motors, indicated by the letters A and B (FIG. 2), energized by the common coil C, only the motor A is described in detail, in the interest of brevity. The motor A comprises inner and outer coaxial radially spaced rotors 52 and 54 disposed between the end wall 14 pole plate 20 coaxial with the coil core 22 with the adjacent end portions of the pole pieces 24-30 disposed within the spacing between the rotors and substantially coextensive with the axial length of the longitudinally extending rotor winding segments. The ends of the pole pieces 24-28 are interconnected by a nonmagnetic centrally apertured plate-like ring 57 and bolts 59. The outside diameter of the ring 57 is slightly less than the inside diameter of the rotor 54. The diameter of the ring aperture being slightly greater than the outside diameter of the inner rotor 52. The inner rotor 52 includes an axle 56 journalled at its commutator end portion with a bearing 58 supported by the end wall 14. The other end of the axle 56 is journalled by a bearing 60 secured to the adjacent face of the pole plate 20 by a nonmagnetic material socket 62.

A disk 64, diametrically substantially equal with respect to the diameter of the outer rotor 54, is interposed between the inner rotor commutator 66 and its rotor windings and connected with the axle 56. A sleeve 68 is secured, at one end, to the periphery of the disk 64 and is journalled at its other end by a bearing 70 surrounding the circular array of pole pieces 24-30 adjacent the pole plate 20 with a nonmagnetic material ring 80 interposed beween the bearing 78 and outwardly disposed surfaces of the respective pole pieces. The segments of the outer rotor 54 are disposed adjacent the inner surface of the sleeve 68 and extend between the disk 64 and bearing 78.

The outer rotor commutator 82 is secured to the disk 64 in coaxial spaced relation with respect to the inner rotor commutator 66, for the purposes presently apparent. The wires joining the segments of the inner and outer rotors pass through a like plurality of apertures formed in the disk 64.

Brush mounting means 84, supported by the end wall 14, surrounds the inner rotor commutator 66 within the outer rotor commutator 82. The brush mounting means 84 comprises four equally spaced brush holders 86, 88, 90 and 92 respectively supporting a set of four inner rotor commutator brushes 94, 96, 98 and 100 and similarly supporting an outer set of outer rotor commutator brushes 102, 104, 106 and 108 contacting the inner periphery of the outer rotor commutator. The respective pairs of cooperating inner and outer brushes 94-102, 96-104, 98-106 and 100-108 being normally urged in opposite directions by springs 110 interposed between the respective pairs of brushes.

As illustrated by FIG. 7, each of the pole pieces 24-30 is formed to define a longitudinally extending rabbetted edge or recess 112 at least coextensive with the segments of the inner rotor 52 in its surface facing the rotor. The remaining portion of the pole piece facing the rotor 52, defined by the surface 114, is no greater than the transverse width across any three segments 116 of the rotor winding of a span seven rotor. Obviously, the recess 112 may be eliminated by forming the pole piece width equal to the width of three rotor segments. This dimension is cooperatively related to the number of commutator segments spanned by the respective brush. Stated another way, the number of rotor winding segments 114 spanned by each pole piece is equal to the number of commutator segments spanned by the respective brush.

The pole piece surface 114 is arcuately curved transversely complemental with the periphery of the rotor 52. The spacing between the pole piece surface 114 and the adjacent surfaces of the commutator segments 116 is preferably 0.020 inches (0.0508 cm) and the vertical depth of the rabbetted edge 112 is approximately one-fourth inches (0.635 cm) or approximately 12½ times the spacing between the pole piece and rotor. The surface of the respective pole piece facing the inner perimeter of the outer rotor 54 is similarly provided with a rabbetted edge or recess 118 diagonally opposite the recess 112 with the remaining width of the outwardly facing surface 120 adjacent the inner periphery of the outer rotor 54 being arcuately curved complemental with the inner periphery of the outer rotor. Similarly, the recess 118 may be eliminated if desired. The width of the outwardly facing pole piece surface 120 is such that it spans any three segments 122 of the longitudinally extending segments of the outer rotor. It being understood that the two rotors 52 and 54 are wound identically, that is, if the inner rotor 52 is a seven span rotor then the outer rotor 54 is also a seven span rotor. The pole piece surface 120 is thus of greater transverse width than the pole piece surface 114 to compensate for the increased width of the outer rotor windings. The spacing between the pole piece surface 120 and outer rotor segments 122 is preferably identical with the spacing set forth hereinabove with respect to the pole piece and inner rotor segments.

Figure 8:
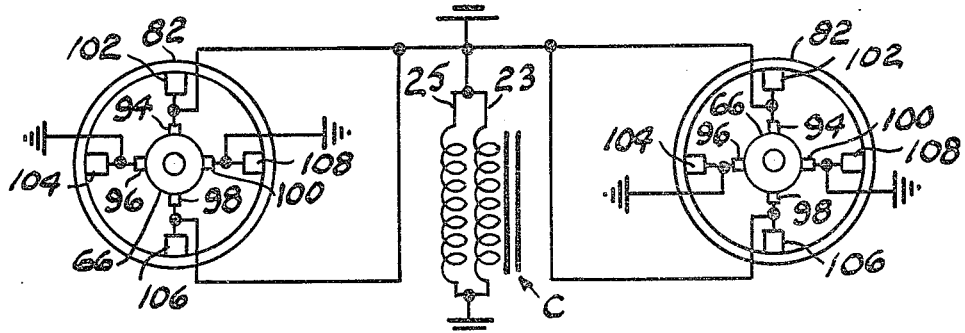
Figure 5:
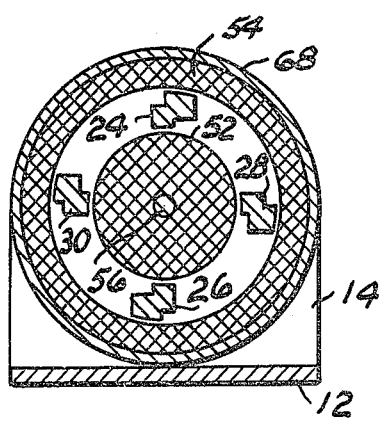
Figure 6:
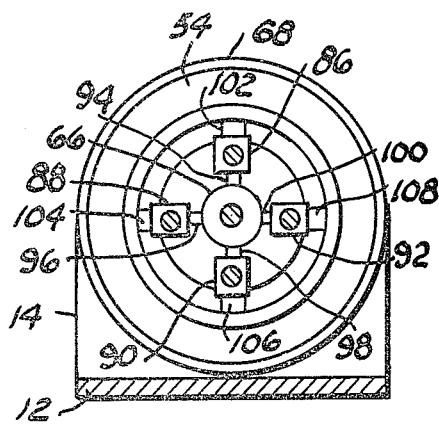

As illustrated by FIG. 8, the battery 125 has its positive terminal connected in parallel with the coil wires 23 and 25 and to diametrically opposite pairs of brushes 94-102 and 98-106. The other two pairs of brushes and other ends of the coil wires are grounded. Conventional controls, not shown, may be incooperated to advance or retard the position of the respective brushes with respect to the position of the pole pieces for increasing or decreasing the angular rate of rotation of the rotors.

It seems obvious that the inner rotor 52 may be removed or its brushes disconnected to utilize only the torque of the outer rotor 54.

Obviously the invention is susceptible to changes or alterations without defeating its practicability. Therefore, I do not wish to be confined to the preferred embodiment shown in the drawings and described herein.

I claim:

1. A motor assembly, comprising:

an elongated nonmagnetic base;

a pair of spaced-apart plates transversely secured to said base intermediate its ends and normal to the plane thereof;

an end wall secured to one end of said base parallel with said plates; concentric rotors, having an annular space therebetween extending between and journalled by said end wall and one said plate, each rotor being characterized by a winding having a plurality of axially extending segments and a commutator having a like plurality of segments and including a pair of commutator brushes each transversely spanning a plurality of commutator segments;

at least one pair of opposing pole pieces, one said pole piece being connected with said one plate and the other said pole piece being connected with the other said plate, said pair of pole pieces projecting toward said end wall parallel with the axis of said rotors and within the annular space therebetween, with pole pieces each being characterized by a transverse surface facing the winding segments of the respective rotor, the transverse dimension of said transverse surface being no greater than the transverse dimension of a plurality of rotor winding segments equal in number to the number of commutator segments spanned by the respective brush; and, magnetic field producing means connected with said plates for establishing a magnetic field, whereby said plates and their respective pole piece are magnetized with respectively different polarities to produce a magnetic flux circuit across the respective rotor windings.

2. The motor according to claim 1 in which said magnetic field means comprises:

a coil core extending between and contacting said plates; and, a coil surrounding said core.

* * * * *